(12) United States Patent
Kim (10) Patent No.: US 8,882,094 B2
(45) Date of Patent: Nov. 11, 2014

(54) VEHICLE BODY MOVING CART

(75) Inventor: Dong Myong Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 704 days.

(21) Appl. No.: 13/172,639

(22) Filed: Jun. 29, 2011

(65) Prior Publication Data
US 2012/0146274 A1 Jun. 14, 2012

(30) Foreign Application Priority Data
Dec. 8, 2010 (KR) .................. 10-2010-0124904

(51) Int. Cl.
*B23Q 3/18* (2006.01)
*B23P 11/00* (2006.01)
*B66F 3/36* (2006.01)
*B62D 65/18* (2006.01)
*B62D 65/02* (2006.01)

(52) U.S. Cl.
CPC .............. *B62D 65/18* (2013.01); *B62D 65/026* (2013.01)
USPC ............................... 269/61; 29/430; 254/100

(58) Field of Classification Search
USPC ................ 269/37, 43, 55, 56, 60, 61, 289 R, 269/136–138, 71; 29/281.1
See application file for complete search history.

(56) References Cited

U.S. PATENT DOCUMENTS

2002/0124377 A1* 9/2002 Nakamura ...................... 29/430

FOREIGN PATENT DOCUMENTS

| JP | 05238439 | 9/1993 |
| JP | 05277848 | 10/1993 |
| JP | 2002-225759 A | 8/2002 |
| JP | 2002-263965 A | 9/2002 |
| KR | 10-2005-0005846 | 1/2005 |

* cited by examiner

*Primary Examiner* — Lee D Wilson
*Assistant Examiner* — Nirvana Deonauth
(74) *Attorney, Agent, or Firm* — Edwards Wildman Palmer LLP; Peter F. Corless (57) ABSTRACT

A vehicle body moving cart is provided which includes a base frame and first moving units that are installed at the front, rear and center of the base frame, respectively. The first moving units are configured to reciprocate first sliding plates forward and rearward on the base frame, respectively. In addition to the first moving units, second moving units are disposed perpendicular to the first moving units installed at the front and rear of the base frame, respectively, and installed on the first sliding plates to move the second sliding plates leftward and rightward on the base frame, respectively. Installed on the second sliding plates and the first sliding plate of first unit installed at the center of the base frame, are ascending and descending units. These ascending and descending units are configured to be reciprocally movable upward and downward on the base frame.

10 Claims, 6 Drawing Sheets

VEHICLE BODY MOVING CART

CROSS-REFERENCE TO RELATED APPLICATION

This application claims priority to and the benefit of Korean Patent Application No. 10-2010-0124904 filed in the Korean Intellectual Property Office on Dec. 8, 2010, the entire contents of which are incorporated herein by reference.

BACKGROUND OF THE INVENTION (a) Field of the Invention

The present invention relates to a vehicle body moving cart, and more particularly to a vehicle body moving cart, which is configured to correspond to vehicle bodies of different shapes and sizes and commonly applicable to various types of vehicles.

(b) Description of the Related Art

Generally, vehicles are manufactured via numerous assembling processes using about twenty to thirty thousands of parts. In particular, vehicle bodies are formed by a first assembling process to produce vehicle body panels in a press process, and each part of the vehicle body is then assembled in a vehicle body factory to form a vehicle body of a body-in-white (B.I.W) state.

The formed vehicle body undergoes a main body process for mounting side walls, a loop, a rear panel, etc. on the floor thereof, and then is painted in a painting process. After that, an engine, a transmission, interior components, and exterior components are assembled in an outfitting process.

Here, the vehicle body is moved along a moving rail connected between the processes, mounted on a vehicle body moving cart, to move the vehicle body to a relevant process or to undergo operations including welding, assembling, sealing, and hemming in a vehicle body assembly process.

However, it is difficult to apply the aforementioned conventional vehicle body moving cart commonly to vehicle bodies associated with different vehicle types as the vehicle bodies come in different shapes and sizes according to vehicle type. Thus, it is necessary to manufacture dedicated vehicle body moving carts according to vehicle type.

Moreover, the manufacture of dedicated vehicle body moving carts according to vehicle type incur large investment costs that increase each time a new vehicle model or type is introduced because of the additional costs associated with remodeling and creating a new vehicle body moving cart. Even further, as vehicle models or types advance the structure of the vehicle body moving carts will also become more and more complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a vehicle body moving cart, which is commonly applicable to various types of vehicles by configuring pin clampers and a support frame for mounting a vehicle body thereon to be freely movable in position, to thereby correspond to different vehicle bodies of different shapes and sizes.

An exemplary embodiment of the present invention provides a vehicle body moving cart which includes a base frame and first moving units that are installed at the front, rear and center of the base frame, respectively. The first moving units are configured to reciprocate first sliding plates forward and rearward on the base frame, respectively. In addition to the first moving units, second moving units are disposed perpendicular to the first moving units installed at the front and rear of the base frame, respectively, and installed on the first sliding plates to move the second sliding plates leftward and rightward on the base frame, respectively. Installed on the second sliding plates and the first sliding plate of first unit installed at the center of the base frame are ascending and descending units. These ascending and descending units are configured to be reciprocally movable upward and downward on the base frame.

Pin clampers are mounted on the ascending and descending units respectively disposed at the front and rear of the base frame. These pin clampers clamp the front and rear of a vehicle body. A support frame is mounted on the ascending and descending unit disposed at the center of the base frame and supports the center of the vehicle body.

The first moving unit includes: a first rail housing that is mounted on the base frame, and has the first sliding plate slidably coupled to an upper portion thereof; a first drive motor that is mounted on one side of the first rail housing, and coupled to a first lead screw engaged with the first sliding plate; a first guide rail that is provided along the longitudinal direction of the first rail housing within the first rail housing; and a first rail block that is installed to be reciprocally movable along the first guide rails, and support the first sliding plate.

In some embodiments of the present invention, the first moving unit may further include a first cover for covering the top of the first sliding plate and the first drive motor may be a servo motor capable of controlling the number of turns and the rotating direction.

In some embodiments of the present invention, the second moving unit may include: a second rail housing that is mounted on the first sliding plate in a direction perpendicular to the first moving unit on top of the first moving unit, and has the second sliding plate slidably coupled to the top thereof; a second drive motor that is mounted on one side of the second rail housing, and coupled to a second lead screw engaged with the second sliding plate; a second guide rail that is provided along the longitudinal direction of the second rail housing within the second rail housing; and a second rail block that is installed to be reciprocally movable along the second guide rail, and support the second sliding plate.

The second moving unit may further include a second cover that is mounted on the second rail housing on top of the second sliding plate and the second drive motor may be a servo motor capable of controlling the number of turns and the rotating direction.

The ascending and descending unit may include: a gear box, which is mounted on top of the first sliding plate of the first moving unit disposed at the center of the base frame and on top of the second sliding plates; an ascending and descending motor that is mounted on one side of the gear box and transmits a driving force to the gear box; a post that is mounted on top of the gear box, and is provided therein with a third lead screw connected to the gear box and third guide rails formed along the longitudinal direction; a third rail block that is installed to be reciprocally movable along the third guide rails; an ascending and descending block that is supported by the third rail block, and is engaged with the third lead screw and provided to be movable along the third guide rail in accordance with the rotation of the third lead screw; and an ascending and descending case that is provided on top of the post and connected to the ascending and descending block.

The gear box may include: a housing, which is mounted on top of the first sliding plate of the first moving unit disposed at the center of the base frame and on top of the second sliding plates; a worm gear that is provided to be rotatable within the housing, and is connected to the third lead screw; and a worm rod that is connected to the ascending and descending motor within the housing, and provided with a worm engaged with the worm gear at one end of the worm rod to transmit the torque of the ascending and descending motor to the worm gear.

The ascending and descending motor may be a servo motor capable of controlling the number of turns and the rotating direction and the case may be connected to the ascending and descending block via a sliding hole formed along the longitudinal direction of the post.

As described above, the vehicle body moving cart according to the exemplary embodiment of the present invention is commonly applicable to various types of vehicles by configuring the pin clampers and the support frame to be freely movable in position on the base frame by means of the moving units and the ascending and descending units so as to correspond to vehicle bodies of different shapes and sizes.

Moreover, the vehicle body moving cart according to the exemplary embodiment of the present invention can reduce initial investment costs and simplify the overall system configuration as it is commonly applicable to vehicle bodies of various vehicle types.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

10: base frame
20: first moving unit
21: first sliding plate
22: first rail housing
23: first drive motor
24: first lead screw
25: first guide rail
26: first rail block
27: first cover
30: second moving unit
31: second sliding plate
32: second rail housing
33: second drive motor
34: second lead screw
35: second guide rail
36: second rail block
40: ascending and descending unit
41: gear box
43: ascending and descending motor
45: post
46: third guide rail
47: third rail block
49: ascending and descending block
51: case
53: housing
55: worm gear
56: worm
57: worm rod It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

An exemplary embodiment of the present invention will hereinafter be described in detail with reference to the accompanying drawings.

The embodiment described in the present specification and the configuration shown in the drawings are merely an exemplary embodiment of the present invention and do not represent all of the technical spirit of the present invention. Thus, it should be understood that there may be various equivalents and modified examples that can replace the embodiments described in the present specification and the configuration shown in the drawings at the time of filling the present application.

Figure 1:
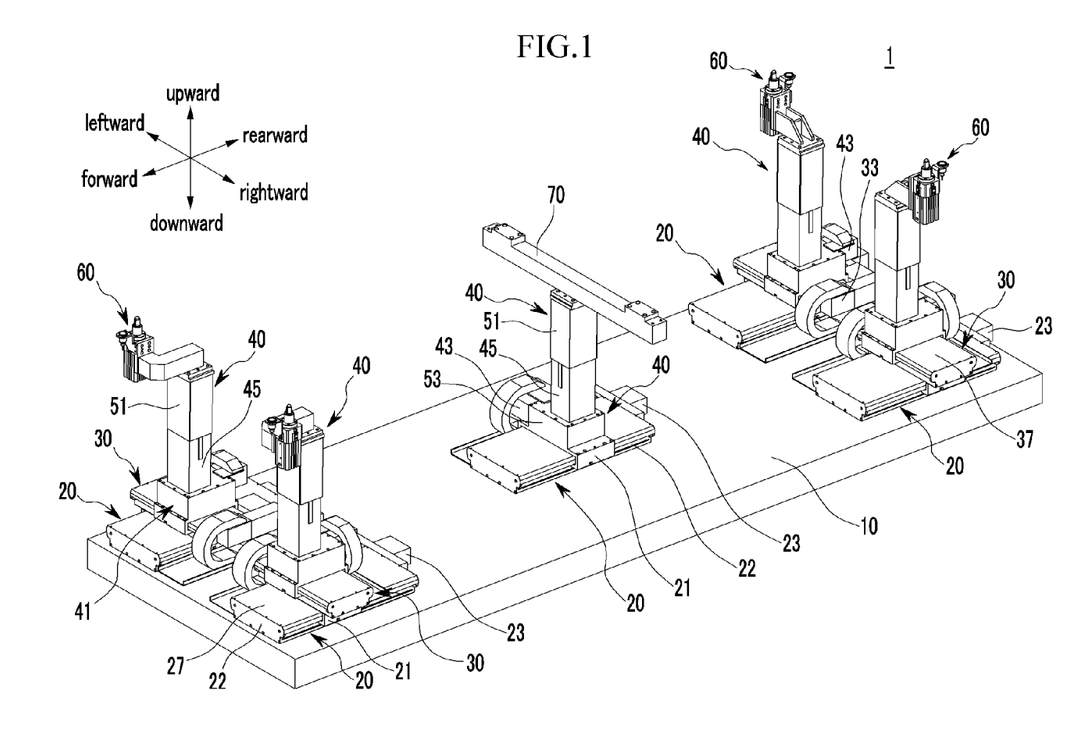
FIG. 1 is a perspective view of a vehicle body moving cart according to an exemplary embodiment of the present invention.
Figure 2:
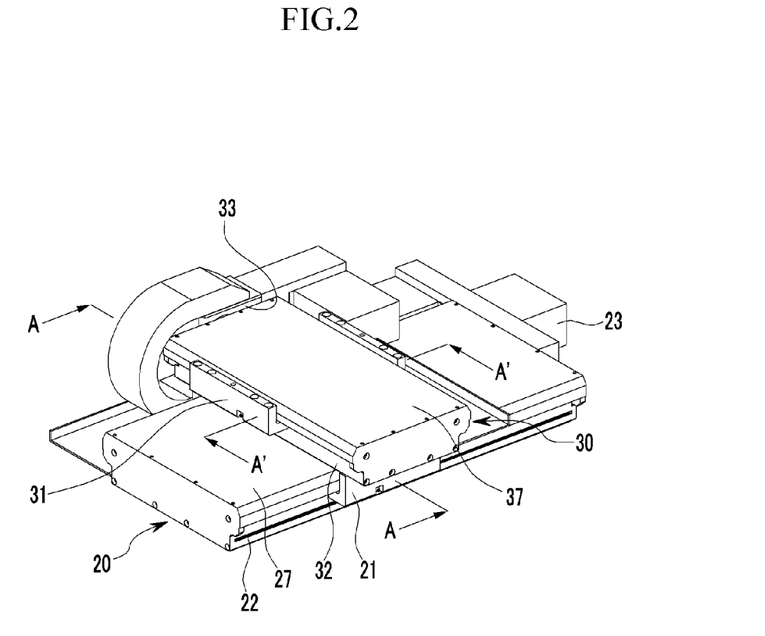
FIG. 2 is a perspective view of first and second moving units applied to the vehicle body moving cart according to exemplary embodiment of the present invention.
Figure 3:
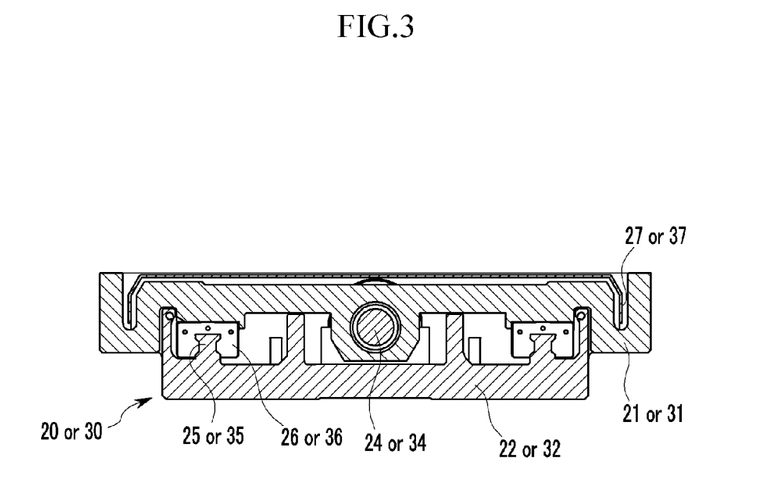
FIG. 3 is a cross-sectional view taken along line A-A and line A'-A' of FIG. 2.
Figure 4:
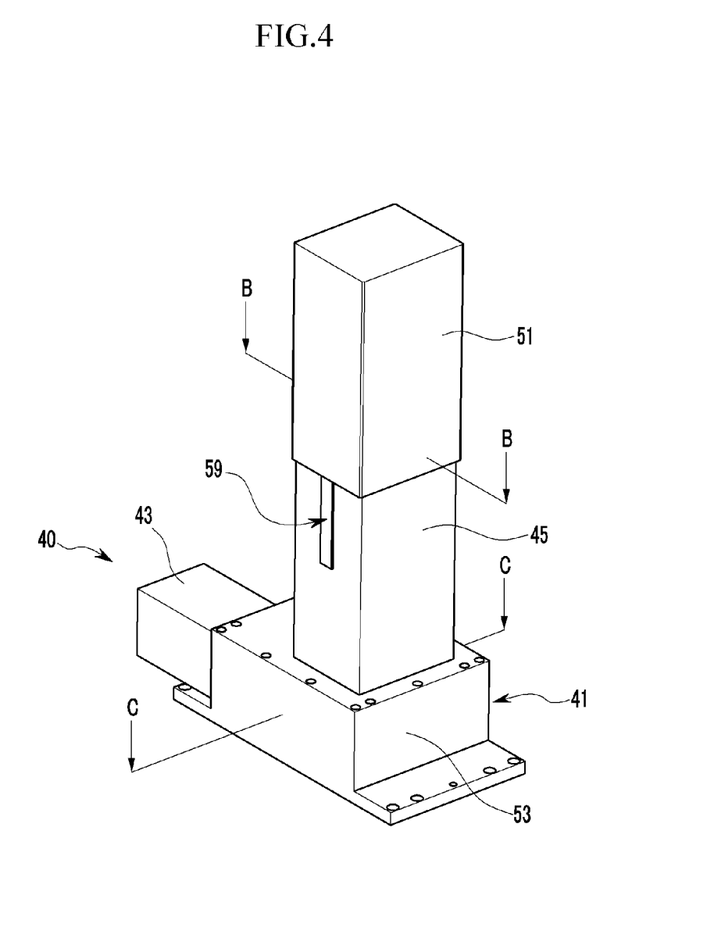
FIG. 4 is a perspective view of an ascending and descending unit applied to the vehicle body moving cart according to exemplary embodiment of the present invention.
Figure 5:
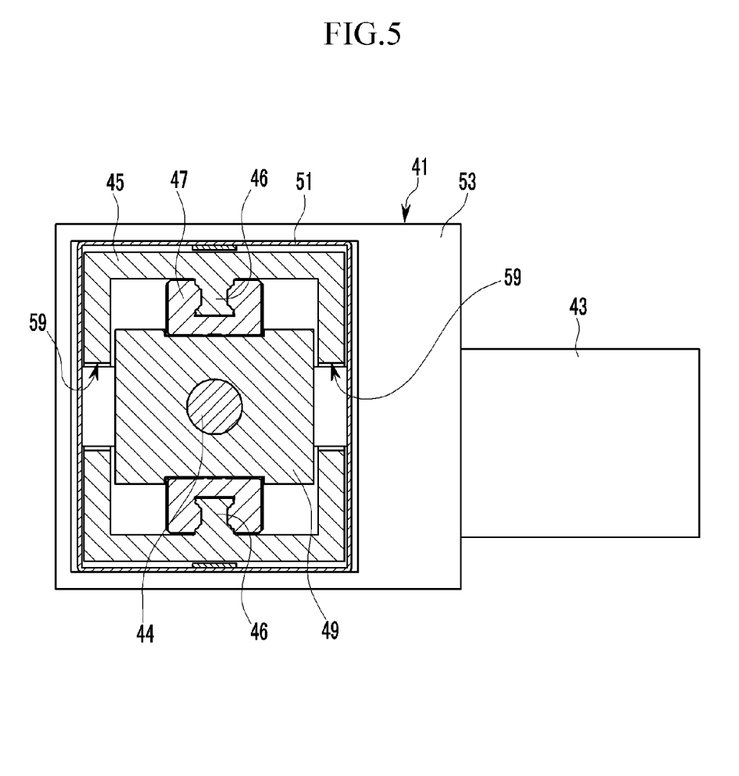
FIG. 5 is a cross-sectional view taken along line B-B of FIG. 4.
Figure 6:
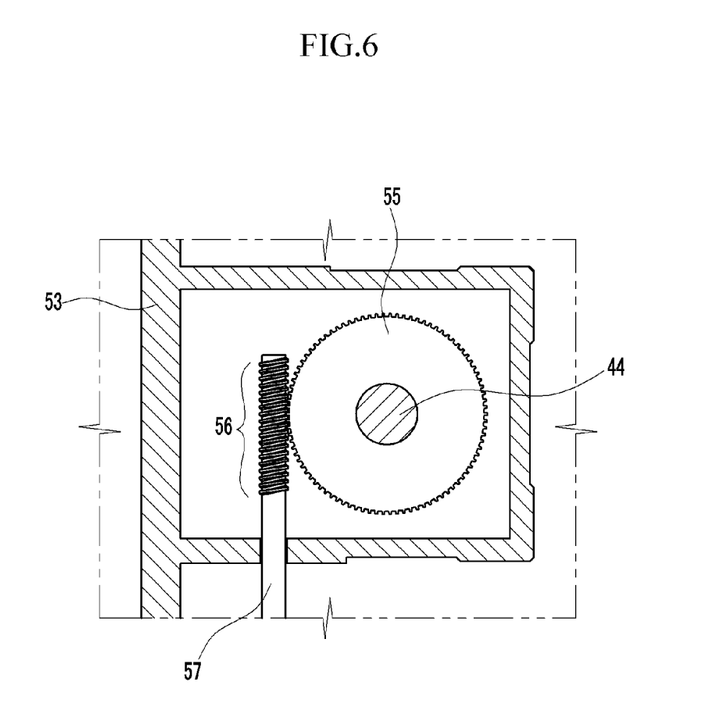
FIG. 6 is a sectional view taken along line C-C, which is a partial cross-sectional view of a gear box applied to the vehicle body moving cart according to the exemplary embodiment of the present invention.

FIG. 1 is a perspective view of a vehicle body moving cart according to an exemplary embodiment of the present invention. FIG. 2 is a perspective view of first and second moving units applied to the vehicle body moving cart according to exemplary embodiment of the present invention. FIG. 3 is a cross-sectional view taken along line A-A and line A'-A' of FIG. 2. FIG. 4 is a perspective view of an ascending and descending unit applied to the vehicle body moving cart according to exemplary embodiment of the present invention. FIG. 5 is a cross-sectional view taken along line B-B of FIG. 4. FIG. 6 is a cross-sectional view taken along line C-C.

A vehicle body moving cart 1 according to an exemplary embodiment of the present invention has, as shown in FIG. 1, a base frame 10, first and second moving units 20 and 30, ascending and descending units 40, pin clampers 60, and a support frame 70.

First, the base frame 10 is provided to be movable along a rail installed on the floor of a workplace so as to connect each process. The first moving units 20 are installed at the front, rear and center of the base frame 10, respectively, and reciprocate first sliding plates 21 forward and rearward on the base frame 10, respectively.

The first moving unit 20 of this type has, as shown in FIGS. 3 and 4, a first rail housing 22, a first drive motor 23, a first guide rail 25, a first rail block 26, and a first cover 27. First, the first rail housing 22 is mounted on the base frame 10, and the first sliding plate 21 is slidably coupled to an upper portion thereof. The first drive motor 23 is mounted on one side of the first rail housing 22, and coupled to a first lead screw 24 engaged with the first sliding plate 21. For example, the first drive motor 23 is may be a servo motor capable of controlling the number of turns and the rotating direction.

The first guide rail 25 is provided along the longitudinal direction of the first rail housing 22 within the first rail housing 22. The first rail block 26 is installed to be movable along the first guide rails 25, and supports the first sliding plate 21. The first cover 27 is provided so as to cover the top of the first sliding plate 21.

That is, in the thus configured first moving unit 20, when the first drive motor 23 rotates in a forward or reverse direction, the first sliding plate 21 reciprocates forward and rearward on the base frame 10 in accordance with the rotation of the first lead screw 24. At this point, the first sliding plate 21 stably slides as the first rail block 26 moves along the first guide rail 25.

The second moving units 30 are disposed perpendicular to the first moving units 20 installed at the front and rear of the base frame 10, are mounted on the first sliding plates 21, and move second sliding plates 31 leftward and rightward on the base frame 10.

In describing the second moving unit 30 according to the exemplary embodiment of the present invention, its shape and components are identical to those of the first moving unit 20. Thus, the description will be made with reference to the aforementioned FIGS. 2 and 3.

Referring to the drawings, the second moving unit 20 has a second rail housing 32, a first drive motor 33, a second guide rail 35, a second rail block 36, and a second cover 37. First, the second rail housing 32 is mounted on the first sliding plate 21 in a direction perpendicular to the first moving unit 20 on top of the first moving unit 20, and the second sliding plate 31 is slidably coupled to the top of the second rail housing 32.

The second drive motor 33 is mounted on one side of the second rail housing 32, and a second lead screw 34 engaged with the second sliding plate 31 is coupled to each rotating shaft. The second drive motor 33 may be a servo motor capable of controlling the number of turns and the rotating direction. The second guide rail 35 is provided along the longitudinal direction of the second rail housing 32 within the second rail housing 32. The second rail block 36 is installed to be movable along the second guide rails 35, and support the second sliding plate 31. The second cover 37 is mounted on the second sliding plate 31 on top of the second sliding plate 31.

In the thus configured second moving unit 30, when the second drive motor 33 rotates in a forward or reverse direction, the second sliding plate 31 reciprocates forward and rearward on the base frame 10 in accordance with the rotation of the second lead screw 34. At this point, the first sliding plate 21 stably slides as the first rail block 26 moves along the first guide rail 25. That is, the second moving unit 30 is mounted on the first sliding plate 21 and moves forward and rearward on top of the base frame 10 in accordance with the operation of the first moving unit 20, and reciprocates the second sliding plate 31 leftward and rightward on top of the base frame 10.

In the present exemplary embodiment, the ascending and descending units 40 are provided on the second sliding plates 31 and the first sliding plate 21 of the first moving unit 20 installed at the center of the base frame 10, and are configured to be reciprocally movable upward and downward of the base frame 10.

As shown in FIGS. 4 to 6, the ascending and descending unit 40 has a gear box 41, an ascending and descending motor 43, a post 45, third rail blocks 47, an ascending and descending block 49, and a case 51. First, the gear box 41 is mounted on top of the first sliding plate 21 of the first moving unit 20 disposed at the center of the base frame 10 and on top of the second sliding plates 31. The ascending and descending motor 43 is mounted on one side of the gear box 41 and transmits a driving force to the gear box 41. The ascending and descending motor 43 may be a servo motor capable of controlling the number of turns and the rotating direction.

As shown in FIG. 5, the post 45 is mounted on top of the gear box 41, and is provided therein with a third lead screw 44 connected to the gear box 41 and a third guide rail 46 formed along the longitudinal direction. In the present exemplary embodiment, the third rail block 47 is installed to be movable along the third guide rail 46. The ascending and descending block 49 is supported by the third rail block 47, and is engaged with the third lead screw 44 and provided to be movable along the third guide rail 46 in accordance with the rotation of the third lead screw 44. That is, when moving the ascending and descending block 49 upward or downward on the third lead screw 44 by the rotation of the third lead screw 44, the ascending and descending block 49 is stably moved by the third rail blocks 47 that is slidably moved along the third guide rail 46.

Here, the gear box 41 rotates the third lead screw 44 by transmitting a torque transmitted from the ascending and descending motor 43 to the third lead screw 44. The gear box 41 of this type has, as shown in FIG. 6, a housing 53, a worm gear 55, and a worm rod 57. First, the housing 53 is mounted on top of the first sliding plate 21 of the first moving unit 20 disposed at the center of the base frame 10 and on top of the second sliding plates 31. The worm gear 55 is provided to be rotatable within the housing 53, and is connected to the third lead screw 44. The worm rod 57 is connected to the ascending and descending motor 43 within the housing 53, and provided with a worm 56 engaged with the worm gear 55 at one end of the worm rod 57 to thereby transmit the torque of the ascending and descending motor 43 to the worm gear 33. That is, in the thus configured gear box 41, when the worm rod 57 is rotated by the ascending and descending motor 43, the worm gear 55 engaged with the worm 56 of the worm rod 57 also rotates, thereby causing the third lead screw 44 to rotate.

The case 51 is inserted on top of the post 45 in such a manner as to be lifted and lowered, and is connected to the ascending and descending block 49. Here, the case 51 may be connected to the ascending and descending block 49 through a longitudinal sliding hole 59 formed along the longitudinal direction of the post 45. That is, in the ascending and descending unit 40 having the above-described configuration, if the ascending and descending motor 43 is operated, the gear box 41 transmits the torque of the ascending and descending motor 43 to the third lead screw 44 to thereby cause the third lead screw 44 to rotate in a forward or reverse direction. Then, the ascending and descending block 49 reciprocates upward and downward on the third lead screw 44. Accordingly, the case 51 connected to the ascending and descending block 49 is moved upward and downward on the base frame 10 by being moved upward and downward from the post 45.

Meanwhile, the third rail block 47 slides along the third guide rail 46 when the ascending and descending block 49 is moved, thereby stably guiding the ascending and descending block 49.

The pin clampers 60 are mounted on top of the cases 51 of the ascending and descending units 40 disposed at the front and rear of the base frame 10 to thereby clamp the front and rear of a vehicle body.

In the present exemplary embodiment, the support frame 70 is mounted on top of the case 51 of the ascending and descending unit 40 disposed at the center of the base frame 10 to thereby support the center of the vehicle body.

The vehicle body moving cart 1 configured as described above adjusts the positions of the second moving units 30 by moving the second moving units 30 forward and rearward by means of the first moving units 20 so as to correspond to vehicle bodies of different sizes and shapes according to vehicle type. At this point, the second moving units 30 move the ascending and descending units 40 leftward and rightward of the base frame 10, respectively, so that the pin clampers 60 are positioned at the front and rear of the vehicle body. Afterwards, when the pin clampers 60 are brought into their normal position at the front and rear of the vehicle body, they are lifted by the operation of the ascending and descending units 40, thereby stably supporting the vehicle body.

Meanwhile, when the pin clampers 60 are brought into their normal position by means of the first and second moving units 20 and 30, the ascending and descending unit 40 mounted by means of the first moving unit 20 mounted at the center of the base frame 10 is moved to the center of the vehicle body by the first moving unit 20, and the support frame 70 is lifted by the ascending and descending unit 40 to thereby support the center of the vehicle body.

Accordingly, the thus-configured vehicle body moving cart according to the exemplary embodiment of the present invention is universally applicable to various types of vehicles by configuring the pin clampers 60 and the support frame 70 to be freely movable in position on the base frame 10 by means of the moving units 20 and 30 and the ascending and descending units 40 so as to correspond to vehicle bodies of different shapes and sizes. Moreover, the vehicle body moving cart 1 according to the exemplary embodiment of the present invention can reduce initial investment costs and simplify the overall system configuration as it is commonly applicable to vehicle bodies of various vehicle types.

In describing the vehicle body moving cart 1 according to the exemplary embodiment of the present invention, the terms "front," "rear," "left", "right," "up", and "down" are used to refer to directions with reference to the figures set forth in this specification for better understanding of the drawings and the present invention. However, the use of these terms is not meant in a limiting sense, and the orientations such as "front," "rear," "left", "right," "up", and "down" in this specifications may be changed.

Furthermore, the control mechanisms of the present invention may be embodied as computer readable media on a non-transitory computer readable medium containing executable program instructions executed by a processor. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle body moving cart, comprising:
   a base frame;
   first moving units installed at the front, rear, and center of the base frame, and reciprocate first sliding plates forward and rearward on the base frame;
   second moving units disposed perpendicular to the first moving units installed at the front and rear of the base frame, respectively, and installed on the first sliding plates to move second sliding plates leftward and rightward on the base frame, respectively;
   ascending and descending units installed on the second sliding plates and the first sliding plate of the first moving unit installed at the center of the base frame, and configured to be reciprocally movable upward and downward of the base frame;
   pin clampers mounted on the ascending and descending units respectively disposed at the front and rear of the base frame and clamp the front and rear of a vehicle body;
   a support frame mounted on the ascending and descending unit disposed at the center of the base frame and supports the center of the vehicle body;
   a first rail housing mounted on the base frame, and having the first sliding plate slidably coupled to an upper portion thereof;
   a first drive motor mounted on one side of the first rail housing, and coupled to a first lead screw engaged with the first sliding plate;
   first guide rails provided along a longitudinal direction of the first rail housing within the first rail housing; and
   first rail blocks installed to be reciprocally movable along the first guide rails, and support the first sliding plate.

2. The vehicle body moving cart of claim 1, wherein the first moving unit further comprises a first cover for covering the top of the first sliding plate.

3. The vehicle body moving cart of claim 1, wherein the first drive motor is a servo motor capable of controlling the number of turns and the rotating direction.

4. The vehicle body moving cart of claim 1, wherein the second moving unit comprises:
   a second rail housing mounted on the first sliding plate in a direction perpendicular to the first moving unit on top of the first moving unit, and having the second sliding plate slidably coupled to the top thereof;
   a second drive motor mounted on one side of the second rail housing, and coupled to a second lead screw engaged with the second sliding plate;
   second guide rails provided along a longitudinal direction of the second rail housing within the second rail housing; and
   second rail blocks installed to be reciprocally movable along the second guide rails, and support the second sliding plate.

5. The vehicle body moving cart of claim 4, wherein the second moving unit further includes a second cover that is mounted on the second rail housing on top of the second sliding plate.

6. The vehicle body moving cart of claim 4, wherein the second drive motor is a servo motor capable of controlling the number of turns and the rotating direction.

7. The vehicle body moving cart of claim 1, wherein the ascending and descending unit comprises:

a gear box mounted on top of the first sliding plate of the first moving unit disposed at the center of the base frame and on top of the second sliding plates;

an ascending and descending motor mounted on one side of the gear box and transmits a driving force to the gear box;

a post mounted on top of the gear box, and provided therein with a third lead screw connected to the gear box and third guide rails formed along the longitudinal direction;

third rail blocks installed to be reciprocally movable along the third guide rails;

an ascending and descending block supported by the third rail blocks, and engaged with the third lead screw and provided to be movable along the third guide rails in accordance with the rotation of the third lead screw; and an ascending and descending case provided on top of the post and connected to the ascending and descending block.

8. The vehicle body moving cart of claim 7, wherein the gear box comprises:

a housing mounted on top of the first sliding plate of the first moving unit disposed at the center of the base frame and on top of the second sliding plates;

a worm gear that is provided to be rotatable within the housing, and connected to the third lead screw; and a worm rod connected to the ascending and descending motor within the housing, and provided with a worm engaged with the worm gear at one end of the worm rod to transmit the torque of the ascending and descending motor to the worm gear.

9. The vehicle body moving cart of claim 8, wherein the ascending and descending motor is a servo motor capable of controlling the number of turns and the rotating direction.

10. The vehicle body moving cart of claim 7, wherein the case is connected to the ascending and descending block via a sliding hole formed along the longitudinal direction of the post.

\* \* \* \* \*